US012333005B2

United States Patent
Liu et al.

(10) Patent No.: US 12,333,005 B2
(45) Date of Patent: Jun. 17, 2025

(54) EFFICIENT TRANSFORMER FOR CONTENT-AWARE ANOMALY DETECTION IN EVENT SEQUENCES

(71) Applicant: NEC Laboratories America, Inc., Princeton, NJ (US)

(72) Inventors: Yanchi Liu, Monmouth Junction, NJ (US); Xuchao Zhang, Elkridge, MD (US); Haifeng Chen, West Windsor, NJ (US); Wei Cheng, Princeton Junction, NJ (US); Shengming Zhang, Kearny, NJ (US)

(73) Assignee: NEC Corporation, Tokyo (JP)

( * ) Notice: Subject to any disclaimer, the term of this patent is extended or adjusted under 35 U.S.C. 154(b) by 348 days.

(21) Appl. No.: 18/157,180

(22) Filed: Jan. 20, 2023

(65) Prior Publication Data

US 2023/0252139 A1 Aug. 10, 2023

Related U.S. Application Data

(60) Provisional application No. 63/308,512, filed on Feb. 10, 2022.

(51) Int. Cl.
*G06F 21/55* (2013.01)
(52) U.S. Cl.
CPC .................................. *G06F 21/554* (2013.01)
(58) Field of Classification Search
CPC ....................................................... G06F 21/55
See application file for complete search history.

(56) References Cited

U.S. PATENT DOCUMENTS

| 11,108,787 | B1* | 8/2021 | Shen | G06N 3/044 |
| 2014/0056391 | A1* | 2/2014 | Lee | H04L 1/0054 |
| | | | | 375/341 |
| 2015/0052090 | A1* | 2/2015 | Lin | G06N 7/01 |
| | | | | 706/12 |
| 2020/0034566 | A1* | 1/2020 | Zhang | G06Q 50/01 |
| 2020/0285807 | A1* | 9/2020 | Xu | G06N 3/04 |

(Continued)

OTHER PUBLICATIONS

Meng, W., Liu, Y., Zhu, Y., Zhang, S., Pei, D., Liu, Y., . . . & Zhou, R. (Aug. 10, 2019). LogAnomaly: Unsupervised detection of sequential and quantitative anomalies in unstructured logs. In IJCAI (vol. 19, No. 7, pp. 4739-4745).

(Continued)

*Primary Examiner* — Raqiul A Choudhury
(74) *Attorney, Agent, or Firm* — Joseph Kolodka

(57) ABSTRACT

A method for implementing a self-attentive encoder-decoder transformer framework for anomaly detection in event sequences is presented. The method includes feeding event content information into a content-awareness layer to generate event representations, inputting, into an encoder, event sequences of two hierarchies to capture long-term and short-term patterns and to generate feature maps, adding, in the decoder, a special sequence token at a beginning of an input sequence under detection, during a training stage, applying a one-class objective to bound the decoded special sequence token with a reconstruction loss for sequence forecasting using the generated feature maps from the encoder, and during a testing stage, labeling any event representation whose decoded special sequence token lies outside a hypersphere as an anomaly.

20 Claims, 7 Drawing Sheets

(56) References Cited

U.S. PATENT DOCUMENTS

2022/0335318 A1* 10/2022 Wang ................. G06F 11/3409
2022/0342982 A1* 10/2022 Huseynov ............ G06F 21/552

OTHER PUBLICATIONS

Du, M., Li, F., Zheng, G., & Srikumar, V. (Oct. 30, 2017). Deeplog: Anomaly detection and diagnosis from system logs through deep learning. In Proceedings of the 2017 ACM SIGSAC conference on computer and communications security (pp. 1285-1298).

Wang, Z., Chen, Z., Ni, J., Liu, H., Chen, H., & Tang, J. (Aug. 14, 2021). Multi-scale one-class recurrent neural networks for discrete event sequence anomaly detection. In Proceedings of the 27th ACM SIGKDD Conference on Knowledge Discovery & Data Mining (pp. 3726-3734).

Meng, W., Liu, Y., Huang, Y., Zhang, S., Zaiter, F., Chen, B., & Pei, D. (Aug. 3, 2020). A semantic-aware representation framework for online log analysis. In 2020 29th International Conference on Computer Communications and Networks (ICCCN) (pp. 1-7). IEEE.

Guo, H., Yuan, S., & Wu, X. (Jul. 18, 2021). Logbert: Log anomaly detection via bert. In 2021 International Joint Conference on Neural Networks (IJCNN) (pp. 1-8). IEEE.

Nedelkoski, S., Bogatinovski, J., Acker, A., Cardoso, J., & Kao, O. (2020, Nov. 17). Self-attentive classification-based anomaly detection in unstructured logs. In 2020 IEEE International Conference on Data Mining (ICDM) (pp. 1196-1201). IEEE.

* cited by examiner

EFFICIENT TRANSFORMER FOR CONTENT-AWARE ANOMALY DETECTION IN EVENT SEQUENCES

RELATED APPLICATION INFORMATION

This application claims priority to Provisional Application No. 63/308,512 filed on Feb. 10, 2022, the contents of which are incorporated herein by reference in their entirety.

BACKGROUND

Technical Field

The present invention relates to detecting anomalies in event sequences and, more particularly, to a transformer for content-aware anomaly detection in event sequences.

Description of the Related Art

It is beneficial to detect anomalies in event sequences, which becomes widely available in many application domains. Indeed, various efforts have been made to capture abnormal patterns from event sequences through sequential pattern analysis or event representation learning. However, existing approaches usually ignore the semantic information of event content.

SUMMARY

A method for implementing a self-attentive encoder-decoder transformer framework for anomaly detection in event sequences is presented. The method includes feeding event content information into a content-awareness layer to generate event representations, inputting, into an encoder, event sequences of two hierarchies to capture long-term and short-term patterns and to generate feature maps, adding, in the decoder, a special sequence token at a beginning of an input sequence under detection, during a training stage, applying a one-class objective to bound the decoded special sequence token with a reconstruction loss for sequence forecasting using the generated feature maps from the encoder, and during a testing stage, labeling any event representation whose decoded special sequence token lies outside a hypersphere as an anomaly.

A non-transitory computer-readable storage medium comprising a computer-readable program for implementing a self-attentive encoder-decoder transformer framework for anomaly detection in event sequences is presented. The computer-readable program when executed on a computer causes the computer to perform the steps of feeding event content information into a content-awareness layer to generate event representations, inputting, into an encoder, event sequences of two hierarchies to capture long-term and short-term patterns and to generate feature maps, adding, in the decoder, a special sequence token at a beginning of an input sequence under detection, during a training stage, applying a one-class objective to bound the decoded special sequence token with a reconstruction loss for sequence forecasting using the generated feature maps from the encoder, and during a testing stage, labeling any event representation whose decoded special sequence token lies outside a hypersphere as an anomaly.

A system for implementing a self-attentive encoder-decoder transformer framework for anomaly detection in event sequences is presented. The system includes a memory and one or more processors in communication with the memory configured to feed event content information into a content-awareness layer to generate event representations, input, into an encoder, event sequences of two hierarchies to capture long-term and short-term patterns and to generate feature maps, add, in the decoder, a special sequence token at a beginning of an input sequence under detection, during a training stage, apply a one-class objective to bound the decoded special sequence token with a reconstruction loss for sequence forecasting using the generated feature maps from the encoder, and during a testing stage, label any event representation whose decoded special sequence token lies outside a hypersphere as an anomaly.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The expansion of new communication technologies and services, along with an increasing number of interconnected network devices contributes to making computer networks ever larger and more complex as intertwined systems. The arising system complexities make it even more challenging to maintain precise system management and lead to system vulnerabilities, as security incidents may occur more frequently. Abnormal states caused by malicious attackers could lead to ramifications including financial losses to the economy and to social well-being. Anomaly detection, which targets uncovering abnormal system behaviors in a timely manner, plays an important role in incident management of large-scale systems. With ubiquitous sensors and networks, large-scale systems continuously generate data, which includes rich information reflecting the runtime status of systems.

One type of data is formatted as event sequences. An event sequence is defined as an ordered series of events, where each event is or can be mapped to a discrete symbol belonging to a finite alphabet, often with content describing the event. Event sequences can be seen in many real-world scenarios. For example, a computer program is a sequence of system command events, an email user possesses a sequence of sending/receiving email events. Different types of event data possess rich content information as well, e.g., the content of system command events is the machine-generated log files, and the subject, contents of the emails are denoted as content of sending/receiving email events, which provides deep insights of the event status. The exemplary embodiments aim to detect anomalous patterns of event sequences with contents considered, e.g., if a computing machine is running under an abnormal state or if an email user is a spammer.

Figure 1:
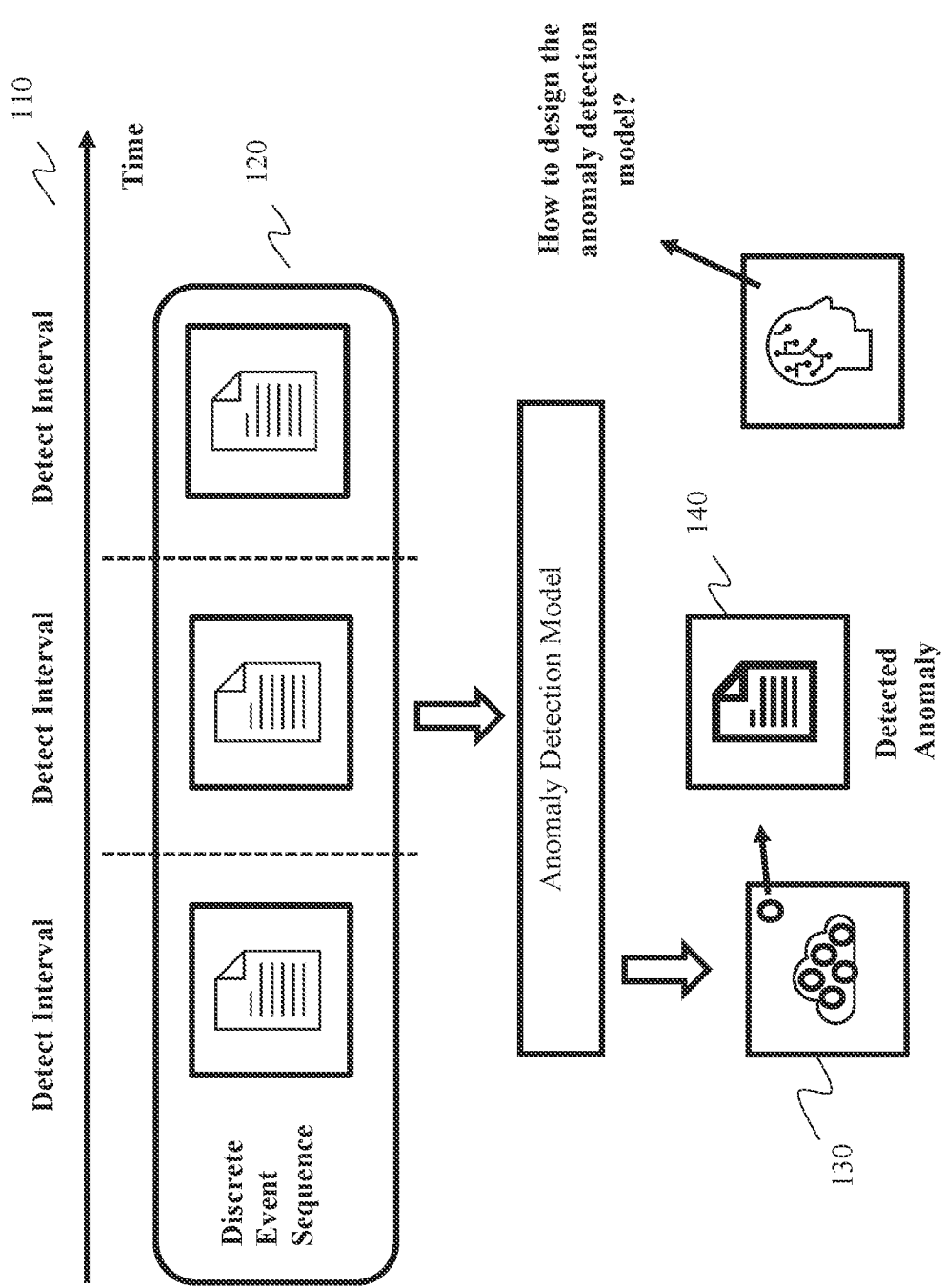
FIG. 1 is a block/flow diagram of an exemplary content-aware event sequence anomaly detection task, in accordance with embodiments of the present invention.

FIG. 1 shows an illustrative example of a system 100 for anomaly detection in event sequences. Event messages are collected within a detect time interval 110, forming event sequences 120. The event sequences 120 are then projected in a latent space 130, where normal event sequences and anomalous ones (140) are distinguishable.

Over the past decades, scholars have made great efforts to address anomaly detection in event sequences. Their methodologies can be grouped into the following categories:

Pattern recognition approaches that report event sequences with above-threshold dissimilarities as anomalies. These study outcomes take event alphabet sequences as input and treat each event as an independent dimension. However, sequential patterns and content information are not considered in these approaches.

Sequential pattern learning approaches that use fixed sliding-window over event sequence and predict the next event based on the observation window. However, content information is not included in these approaches. The next-event-prediction scheme with fixed observation window size cannot capture sequential patterns outside the scope of sliding windows.

Representation learning approaches that map event contents to templates and generate event content representations for each template. However, they use simple aggregation of each event content token's representation as the event embedding. The templates capture limited semantic information and the dependency between tokens are not considered.

The exemplary methods propose to approach the problem by introducing a self-attentive encoder-decoder transformer model to capture both sequential pattern and semantic information in event sequences. Although a transformer model has been successfully applied on a wide range of research problems involving sequential data, directly applying existing transformer models to the event sequence anomaly detection problem remains challenging for at least the following reasons. Existing transformer models are usually designed for sequence forecasting, while the present problem targets anomaly detection. Most existing transformer models cannot naturally capture the content information in event sequences. Another issue of existing transformer models is the efficiency and scalability issue. Detecting anomalies need to be executed over the air. It indicates the detection procedure needed to be conducted under a timely, online scheme that needs to be specifically addressed. Similarly, sometimes the events in a detect interval can be densely populated such that the event sequence length is long. The commonly used one-at-a-time forecasting scheme brings about scalability concerns, which need to be addressed as well.

To overcome the aforementioned deficits of existing transformer models, the exemplary methods present a Content-Aware Transformer (CAT) to address the anomaly detection problem in event sequences. CAT adopts a self-attentive encoder-decoder transformer architecture, where the encoder learns event sequence representations, and the decoder embeds event sequences into a latent space, where anomalies are distinguishable. Specifically, a content-awareness layer is presented to process the event content information, generating representations of each event. The event representations are then grouped as event representation sequences as the input of the encoder and decoder. In the encoder, preamble event sequences are encoded as feature maps for the decoder's reference. In the decoder, a special token that represents the event sequence status is added to the start of the decoder's input representation sequence, denoted as [SEQ]. During the training stage, the decoded representation distribution of the [SEQ] token for all the event sequences is bounded under a one-class objective, forming an optimal hypersphere. In the testing stage, any event sequence who's decoded [SEQ] representation lies outside the hypersphere is considered as an anomaly. Such training scheme requires only normal event sequences for training, which addresses label efficiency. Furthermore, the decoder is designed to simultaneously forecast all the remaining events, and a multi-head attention module is substituted as a sparse one so that the scalability and efficiency issues are addressed.

Figure 2:
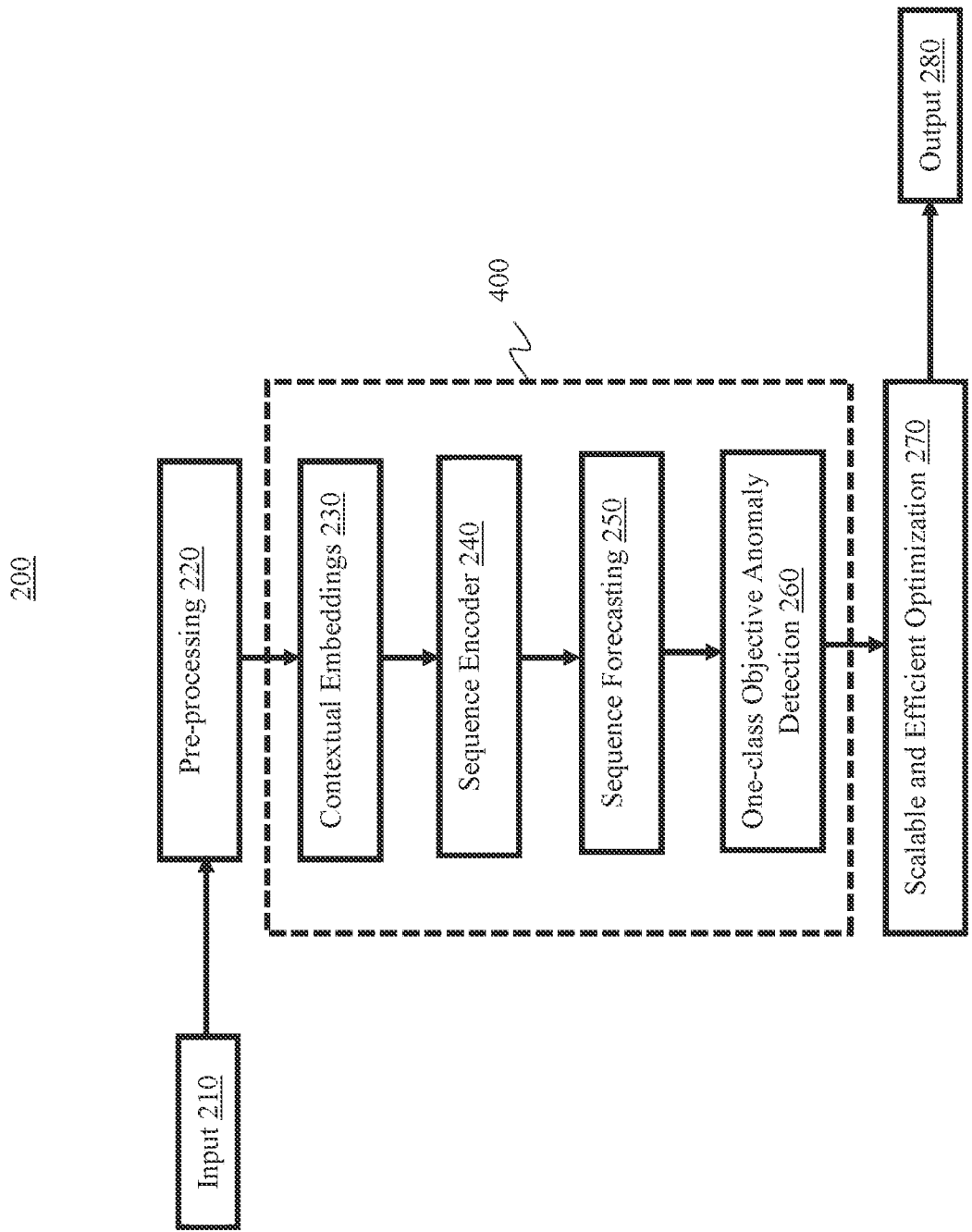
FIG. 2 is a block/flow diagram of an exemplary process flow of the content-aware transformer (CAT), in accordance with embodiments of the present invention.

FIG. 2 is block/flow diagram of exemplary flow of the content-aware transformer (CAT), in accordance with embodiments of the present invention.

In the process flow 200, input 210 is received for pre-processing 220. The data is fed into the CAT 400 which includes contextual embeddings 230, sequence encoding 240, sequence forecasting 250, and a one-class objective anomaly detector 260. The CAT 400 generates scalable and efficient optimization 270 of output 280.

An event is considered as a sequence of tokens. Formally, an event is $e=\{tok_1, tok_2, \ldots tok_{|e|}\}$, where $tok_i$ represents the i-th tokenized words/symbols or numbers, and $|e|$ is the total number of tokens.

An event sequence can be described as a consecutive sequence of events ordered chronologically within an observed time window. Formally, an event sequence is $S=\{e_1, e_2, \ldots, e_{|S|}\}$, where $e_i$ represents the i-th event, and $|S|$ is the total number of events sampled within a time window.

Regarding event sequence anomaly detection, a set of event sequences $S=\{S_1, S_2, \ldots, S_{|S|}\}$ is given as the training set. An anomaly detection model learns key patterns that given a new event sequence, the model could indicate if it is a normal sequence or an anomaly. If it is under an unsupervised learning scheme, the training event sequence set S will only contain normal sequences.

Regarding sequential neural networks, the problem of neural sequential pattern learning refers to using deep neural network-based approaches to extract knowledge from sequential data. Many popular models are devised to construct hidden representations $H^t$ for the input representations $X^t$, where t refers to the t-th indexed token of a sequence. There are mainly three popular types of message-passing modules. The first is recurrent-based message passing:

$$H^t = \sigma(RNN(H^{t-1}, X^t)) \tag{1}$$

The recurrent-based message passing indicates that the hidden representation of the current state is related to both its input and the hidden representation of the previous state. $\sigma(.)$ is the activation function. The second is the convolutional-based message passing:

$$H^t = \sigma(\text{Conv1d}([X^{t-k}, \ldots, X^{t-1}, X^t])) \quad (2)$$

Conv1d(.) performs a 1-D convolutional filter on the time dimension. k is the kernel length. Most recently, attention-based transformer message passing has drawn some attention:

$$\text{Attention}(Q, K, V) = \text{softmax}\left(\frac{QK^T}{\sqrt{d_k}}\right)V \quad (3)$$

The Q, K, V variables denote packed matrices of queries, keys and values, and $d_k$ is a scaling factor. If it is under a self-attention scheme, Q, K, V variables can be substituted as the input representation X.

Figure 3:
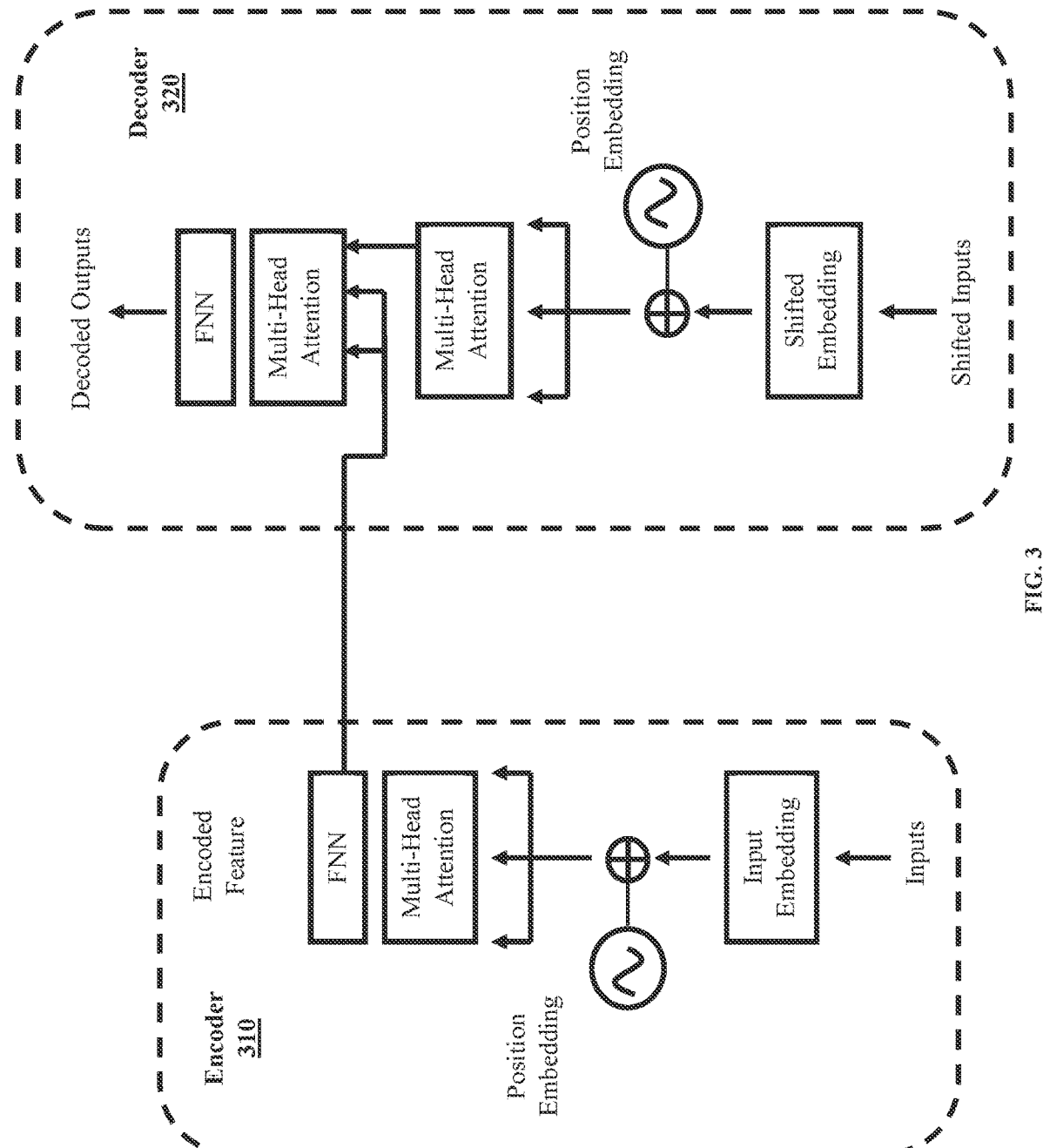
FIG. 3 is a block/flow diagram of an exemplary encoder-decoder transformer, in accordance with embodiments of the present invention.

FIG. 3 shows an illustration of the attention-based "encoder-decoder" transformer.

A novel self-attentive encoder-decoder transformer framework is thus presented, referred to as Content-Aware Transformer (CAT) for event sequence anomaly detection. In CAT, the encoder captures preamble sequential patterns with content awareness and the decoder bounds the event sequence distribution for anomaly detection.

In particular, the following challenges are addressed:

Regarding a first challenge, existing transformer-based approaches cannot naturally capture the content information in event sequences, and although some of the existing anomaly detection models consider semantic information, they are based on general word language models. Thus, the first challenge is stated as follows: How to design a transformer-based model that could capture comprehensive content information of event sequences?

Regarding a second challenge, existing transformer models are usually designed for sequence forecasting tasks, while the goal is to address anomaly detection. Thus, the second challenge is stated as follows: How to design a transformer model specifically for the anomaly detection problem in event sequences?

Regarding a third challenge, the exemplary transformer can handle long sequences in a responsive manner. However, the self-attention mechanism of the transformer limits the efficiency and the one-at-a-time forecasting scheme thresholds the capacity for long sequences. Thus, the third challenge can be stated as follows: How to design a scalable and efficient transformer for event sequence anomaly detection?

The proposed CAT framework is under a self-attentive encoder-decoder transformer architecture. To capture comprehensive semantic information of events, a content-awareness layer is built to extract semantic patterns. In the encoder, preamble event sequences are given as inputs, being encoded as feature maps. In the decoder, a special sequence token [SEQ] integrates at the beginning of input sequence, denoting the sequence state. A one-class objective is applied to bound the decoded [SEQ] token representations together with a reconstruction loss for sequence forecasting. By using a collective sequence forecasting scheme, the CAT framework could deal with event sequences of longer length, and by substituting the original self-attentional module to a sparse attention block, the exemplary methods address the efficiency issue.

Figure 4:
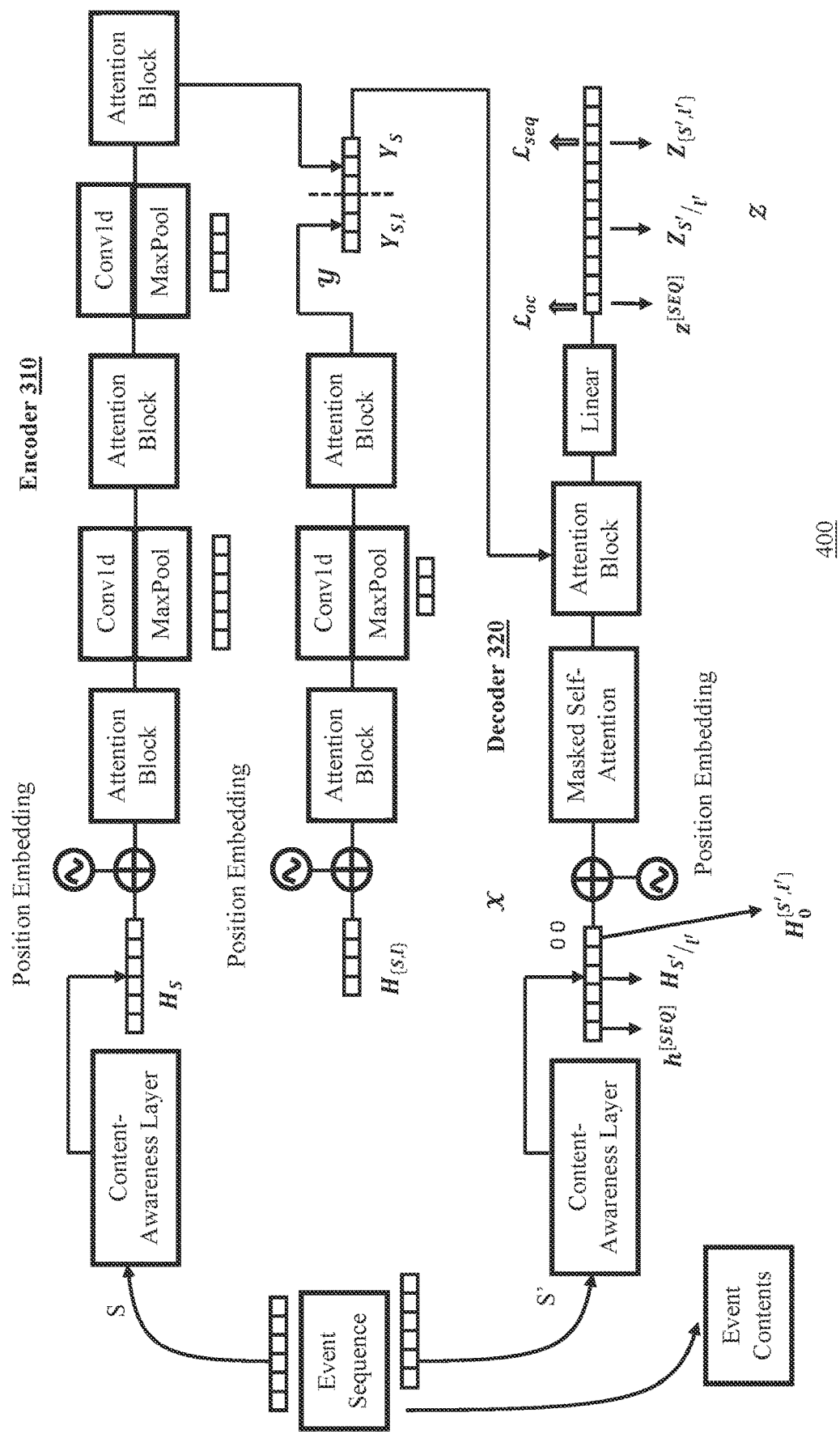
FIG. 4 is a block/flow diagram of an exemplary architecture of the CAT, in accordance with embodiments of the present invention.

FIG. 4 shows the overall architecture of CAT 400.

Regarding the self-attentional encoder-decoder paradigm, in terms of training scheme, the exemplary transformer can be trained either directly with a task-specific loss, or with an "encoder-decoder" structure.

FIG. 3 shows the general architecture of the self-attentional encoder-decoder paradigm. For an "encoder-decoder" structure, the encoder 310 generates hidden representations $H^t$ of inputs $X^t$, while the decoder 320 generates output representations $Y^t$.

For model stability concerns, a multi-head attention mechanism is usually applied:

$$\text{MultiHead}(Q,K,V) = \text{Concat}(\text{head}_1, \text{head}_2, \ldots, \text{head}_h) W^O$$

where $\text{head}_i = \text{Attention}(QW_i^Q, KW_i^K, VW_i^V)$ (4)

Here, $W_i^Q$, $W_i^K$, $W_i^V$ are projection matrices for each head i, and $W^O$ denotes the projection matrix of the concatenated multi-heads. Each of the multi-head attention layers is followed by a fully connected feed-forward network:

$$\text{FFN}(x) = \text{ReLU}(xW_1 + b_1)W_2 + b_2 \quad (5)$$

In the decoder 320, a step-by-step dynamic decoding process is usually applied that predicts output representations from the k-th to (k+1)-th step, until reaching the end of the sequence.

The encoder 310 is specialized for extracting sequential patterns of preamble event sequences with content-awareness.

Regarding the content-awareness layer, the exemplary embodiments present a content-awareness layer to capture comprehensive semantic patterns of events. Given an event e, one special classification token [CLS] is added at the start of the event token sequence, and another special token [SEP] is added at the end of the sequence. The content-awareness layer starts with a pre-trained BERT and is further fine-tuned over the event corpus throughout the training process.

The following objective function is proposed to capture the semantic patterns:

$$\mathcal{L}_{sem} = \underset{\Theta}{\text{argmin}} - \sum_{t=1}^{|e|} \sum_{c=1}^{V} y_{o,c}^t \log p_{o,c}(tok_t \mid e_{\setminus t}; \Theta) \quad (6)$$

Here V, is the vocabulary size, $y_{o,c}^t$ is a binary indicator of 0 and 1 that if or not observation o of token t is equal to the current class c, $p_{o,c}$ is the predicted language model (LM) probability of the current class c, $e/t = \{tok_1, \ldots, tok_{t-1}, tok_{t+1}, \ldots, tok_{|e|}\}$ is the token sequence excluding the current token t, and $\Theta$ is the set of model parameters of the content-awareness layer.

In terms of extracting event representations, the event's representation is extracted directly via regression over their [CLS] token noted as $h^{[CLS]}$.

Figure 7:
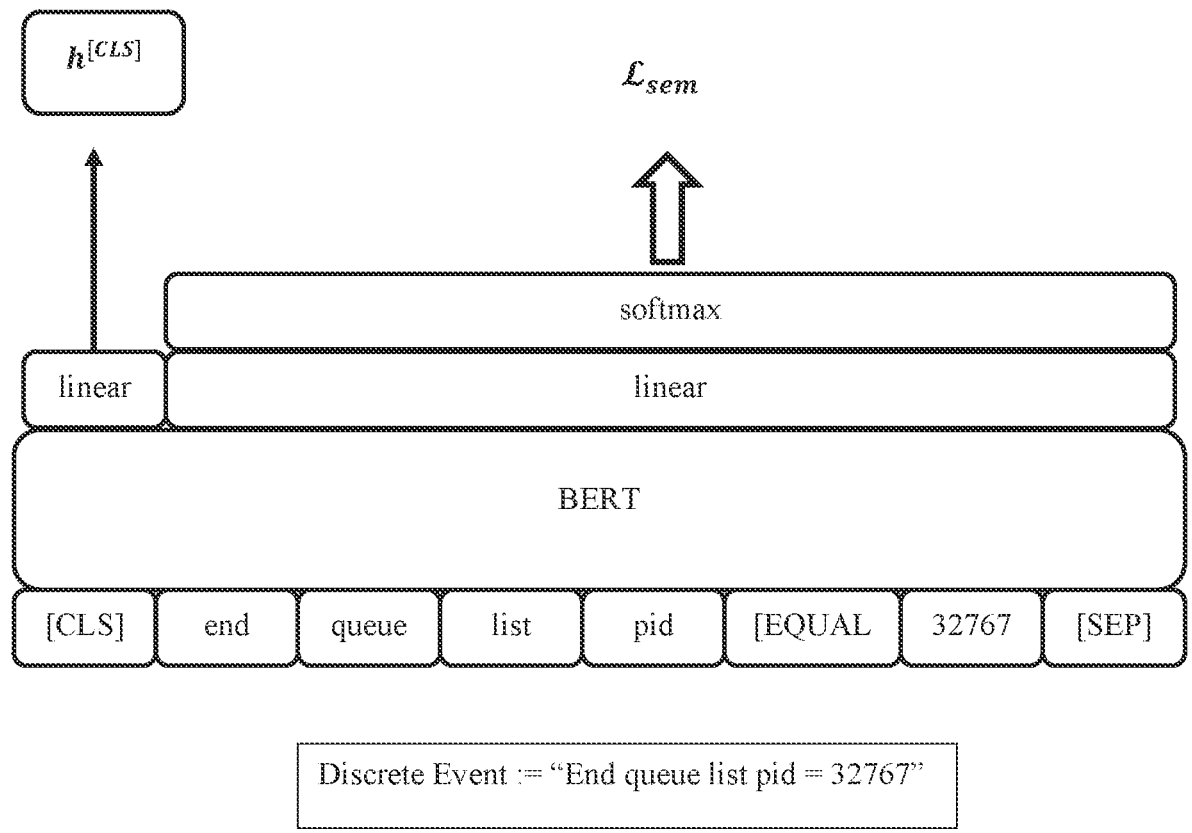
FIG. 7 is a block/flow diagram of an exemplary architecture of the content-aware layer, in accordance with embodiments of the present invention.

FIG. 7 shows the architecture 700 of the content awareness layer (CAT 400). The exemplary content-awareness layer addresses the first challenge.

Regarding the sequential layer, for a given input of preamble event sequence $S = \{e_1, e_2, \ldots, e_{|S|}\}$, the exemplary methods generate the event representation sequence $$H_S = \{h_1^{[CLS]}, h_2^{[CLS]}, \ldots, h_{|S|}^{[CLS]}\}, \text{ where } h_i^{[CLS]}$$

corresponds to the regression over [CLS] token of event $e_i$.

A sub-sequence of $H_S$ is stacked and denoted as $$H_{\{S,l\}} = \{h_l^{[CLS]}, h_{l+1}^{[CLS]}, \ldots, h_{|S|}^{[CLS]}\}.$$

l refers to local, indicating the sub-sequence encodes information from a local perspective. Such setting ensures both long-term and short-term memories or patterns are preserved.

The procedure that forwards from the j-th layer into the (j+1)-th layer is:

$$H_S^{j+1} = \text{MaxPool}(ELU(Conv1d(\text{Attention}(H_S^j, H_S^j, H_S^j)))) \quad (7)$$

Comparing Equation 4 to Equation 7, the original fully connected feed-forward network is substituted as a 1-D convolutional filter (kernel width=3) with the ELU(.) activation function, which has proved to be effective. The input is downsampled by adding a MaxPool layer with stride=2. This serves two purposes, in that, it decreases the memory usage, as well as distilling redundant values drawn from the self-attention mechanism. A similar technique has proved to be effective for long-sequence forecasting.

The encoded long-term and short-term representations ($H_S$, $H_{\{S,l\}}$) are concatenated as the final feature map:

$$y = [Y_S] \| [Y_{S,l}]_{dim=1} \quad (8)$$

where $Y_S$, $Y_{\{S,l\}}$ denote the corresponding encoded feature maps of $H_S$ and $H_{\{S,l\}}$, and $[.] \| [.]_{dim=1}$ is the concatenation operator of two matrices on the column-wise dimension. The encoded feature map y serves as key and value inputs of the attention block in the decoder 320.

The decoder 320 is specifically designed for event sequence anomaly detection in the form of auto-regression preserved long sequence forecasting together with a one-class anomaly detection objective.

Regarding the generative inference for long sequence forecasting, the input sequence of decoder S' is usually chronologically placed after the preamble sequence S of the encoder 310, either with or without event overlaps. Similar to the encoder 310, the event sequence is first fed into the content-awareness layer, generating the event representation sequence $H_{S'}$. Instead of using the original one-at-a-time forecasting procedure, the exemplary methods employ a generative inference that utilizes a one-time inference for prediction. Specifically, a sub-sequence of $H_{S'}$ is selected as the start sequence, which is denoted as $$H_{S'/l'} = \{h_1^{[CLS]}, h_2^{[CLS]}, \ldots, h_{l'-1}^{[CLS]}\}.$$

The remaining part of sequence, e.g., the prediction sequence is substituted as padded zeros, noted as the padding matrix $$H_0^{\{S',l'\}}.$$

The decoder 320 infers the zero-padded prediction sequence by a one forward procedure rather than a conventional left-to-right decoding with one position offset, which is time-consuming. To capture the characteristic of the entire decode event sequence, the exemplary methods add representation of one special sequence token, $h^{[SEQ]}$ at the start of the decode event representation sequence, forming the complete decoder input X as:

$$X = [h^{[SEQ]}] \| [H_{S'/l'}] \| [H_0^{\{S',l'\}}]_{dim=1} \quad (9)$$

For each stack of the decoder layer, it first comes with a masked self-attention sub-layer that preserves the auto regressive property. It is implemented by masking out (setting to $-\infty$) all illegal dot-product attention values. The procedure in the decoder that forwards from the j-th layer into the (j+1)-th layer is:

$$H_{S'}^{j+1} = FFN(\text{Attention}(\text{Mask}-\text{Attention}(H_S^j), \mathcal{Y}, \mathcal{Y})) \quad (10)$$

In the attention sub-layer, y serves as the packed key and value matrices in Equation 3. The output of the last stacked layer is followed by a fully connected layer that transfers the shape back to X for comparison. The complete decoded output Z is denoted as:

$$z = [z^{[SEQ]}] \| [Z_{S'/l'}] \| [Z_{\{S',l'\}}]_{dim=1} \quad (11)$$

It includes three parts, $z^{[SEQ]}$ is the decoded output of the [SEQ] token, $$Z_{S'/l'}$$

is the decoded output sequence of the start sequence $$H_{S'/l'}$$

and $Z_{\{S',l'\}}$ is the decoded output sequence for the padded prediction sequence.

By comparing the ground-truth and forecast result of the prediction sequence, the reconstruction loss $L_{seq}$ is given as:

$$\mathcal{L}_{seq} = \underset{\Phi}{\text{argmin}} \frac{1}{|Z_{\{S',l'\}}|} \sum_{i=l'}^{|Z_{\{S',l'\}}|} \|z_{\{S',l'\}}^i - h_{\{S',l'\}}^i\|^2 \quad (12)$$

Here $$z_{\{S',l'\}}^i$$

and $$h_{\{S',l'\}}^i$$

are the i-th event of $Z_{\{S',l'\}}$ and $H_{\{S',l'\}}$, and $|Z_{\{S',l'\}}|$ is the number of events in $Z_{\{S',l'\}}$, which is $|S'|-l'+1$. $\Phi$ is the set of model parameters.

The exemplary reconstruction loss $L_{seq}$ avoids the use of a softmax function that maps events to its corresponding alphabets. Getting rid of event alphabet mapping is beneficial for at least two reasons, that is, increasing the forecasting speed when the alphabet space of events is very large, such as the sensor data of drones and is easy to deal with out-of-vocabulary (oov) events or events without straight access of corresponding alphabets, e.g., the system calls log data needs parsing to obtain template indices, which could be inaccurate.

Regarding the event sequence anomaly detection with one-class objective function, to enable the self-attentive encoder-decoder transformer model for the anomaly detection task in event sequences, a one-class objective function is adopted, which can be trained with objects of only one class but can indicate if a new object belongs to this class or not. Specifically, the decoded output of the added [SEQ] token is treated as the latent representation of an event sequence. A natural assumption is that all normal event sequences' latent representations should distribute closely with each other, forming a hypersphere.

A one-class objective aims at finding a hypersphere with minimum volume that can include all the normal event sequences' latent representations. During the testing stage, any sequence whose latent representation lies outside the hypersphere boundary is classified as anomaly. The loss function $L_{oc}$ is given as:

$$\mathcal{L}_{oc} = \underset{\Phi}{\text{argmin}} \sum_i \left\| z_i^{[SEQ]} - a \right\|^2 \qquad (13)$$

Here a is the center of all decoded output of [SEQ] tokens in the training set S, where $z_i^{[SEQ]}$ corresponds to token representation of sequence $S_i \in S$.

Such form of loss function, although commonly used in other works, only forces latent representations to be close with each other, but not forming a decision boundary. Some ad-hoc heuristics have been introduced to fix this issue, such as selecting the latent representation whose distance to the center ranks at a certain percentile as the decision boundary's radius.

Instead, the exemplary methods choose to find a "soft-margin" decision boundary based on the trained latent representations by solving the optimization problem:

$$\underset{\Phi, R, \xi}{\text{argmin}} \ R^2 + C \sum_i \xi_i \qquad (14)$$

with the constraint:

$$\left\| z_i^{*[SEQ]} - a^* \right\|^2 \leq R^2 + \xi_i, \ \xi_i \geq 0 S_i \in S \forall \ i$$

C is a parameter that controls the trade-off between the volume R and the errors $\xi$.

$$z_i^{*[SEQ]}$$

and a* are the trained latent representations and center, respectively. The exemplary one-class objective together with decision boundary optimization properly addresses the second challenge.

The encoder-decoder transformer-based model CAT has no need for creating multiple observation instances of one event sequence, making it irrelevant to sequence length.

The exemplary methods substitute fully connected feed-forward network modules (FFN) to 1-D convolutional filters, followed by a MaxPool layer that further down-samples the size.

The decoder of the CAT performs a one-time inference for predicting all events rather than using the conventional left to-right decoding with one position offset and is optimized under an L2-norm reconstruction loss, making it less sensitive to sequence length and irrelevant to event alphabet space. The exemplary methods adopt a sparse version of the self-attention module that preserves top-K valued attentions. Together with all the efficiency-oriented settings, the CAT is efficient in comparison with other event sequence anomaly detection approaches, effectively addressing the third challenge.

In conclusion, the exemplary methods propose a self-attentive encoder-decoder transformer framework, Content-Aware Transformer (CAT), for anomaly detection in event sequences. In CAT, the encoder learns preamble event sequence representations with content awareness, and the decoder embeds sequences under detection into a latent space, where anomalies are distinguishable. Specifically, the event content is first fed to a content-awareness layer, generating representations of each event. The encoder accepts preamble event representation sequences, generating feature maps. In the decoder, an additional token is added at the beginning of the sequence under detection, denoting the sequence status. A one-class objective together with sequence reconstruction loss is collectively applied to train the framework under the label efficiency scheme. Furthermore, CAT is optimized under a scalable and efficient setting.

Figure 5:
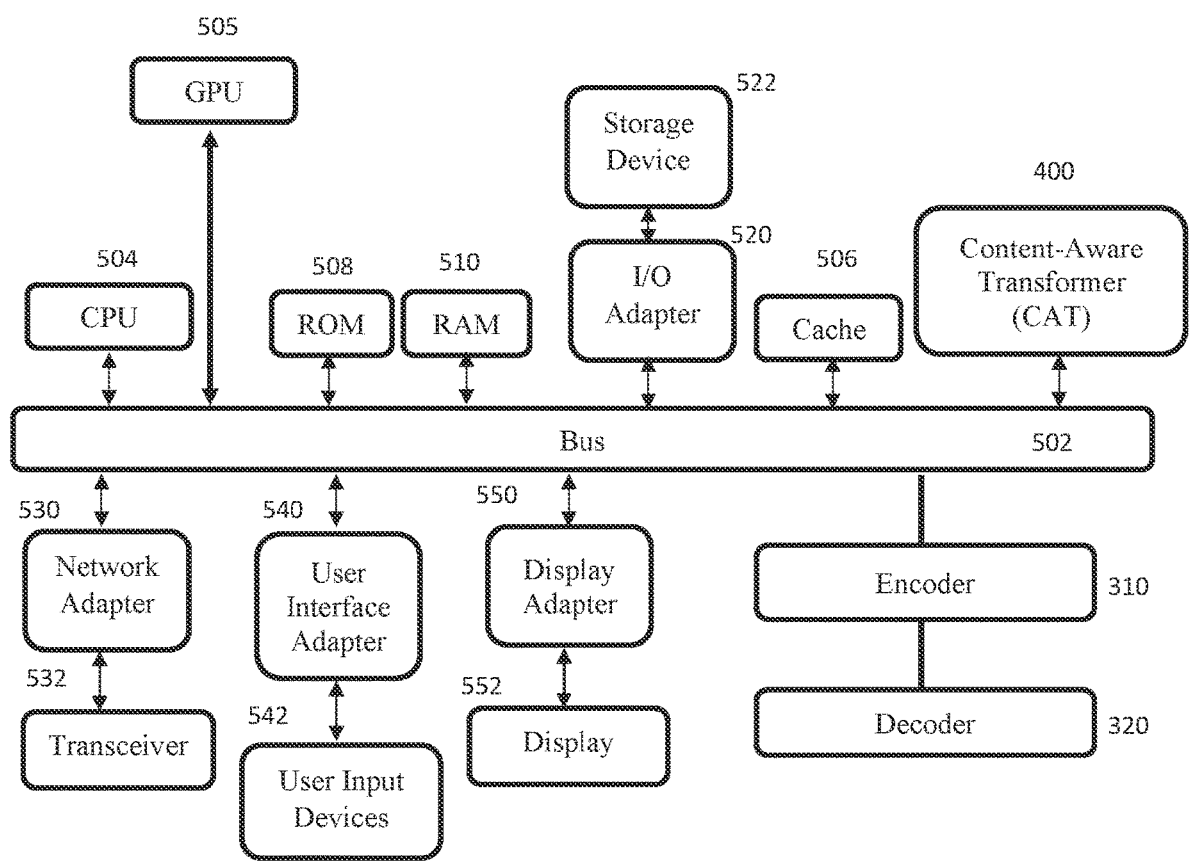
FIG. 5 is an exemplary processing system for implementing a self-attentive encoder-decoder transformer framework for anomaly detection in event sequences, in accordance with embodiments of the present invention.

FIG. 5 is an exemplary processing system for implementing a self-attentive encoder-decoder transformer framework for anomaly detection in event sequences, in accordance with embodiments of the present invention.

The processing system includes at least one processor (CPU) 504 operatively coupled to other components via a system bus 502. A Graphical Processing Unit (GPU) 505, a cache 506, a Read Only Memory (ROM) 508, a Random Access Memory (RAM) 510, an Input/Output (I/O) adapter 520, a network adapter 530, a user interface adapter 540, and a display adapter 550, are operatively coupled to the system bus 502. Additionally, the CAT 400 includes an encoder 310 and a decoder 320.

A storage device 522 is operatively coupled to system bus 502 by the I/O adapter 520. The storage device 522 can be any of a disk storage device (e.g., a magnetic or optical disk storage device), a solid-state magnetic device, and so forth.

A transceiver 532 is operatively coupled to system bus 502 by network adapter 530.

User input devices 542 are operatively coupled to system bus 502 by user interface adapter 540. The user input devices 542 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 542 can be the same type of user input device or different types of user input devices. The user input devices 542 are used to input and output information to and from the processing system.

A display device 552 is operatively coupled to system bus 502 by display adapter 550.

Of course, the processing system may also include other elements (not shown), as readily contemplated by one of skill in the art, as well as omit certain elements. For example, various other input devices and/or output devices can be included in the system, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system are readily contemplated by one of ordinary skill in the art given the teachings of the present invention provided herein.

Figure 6:
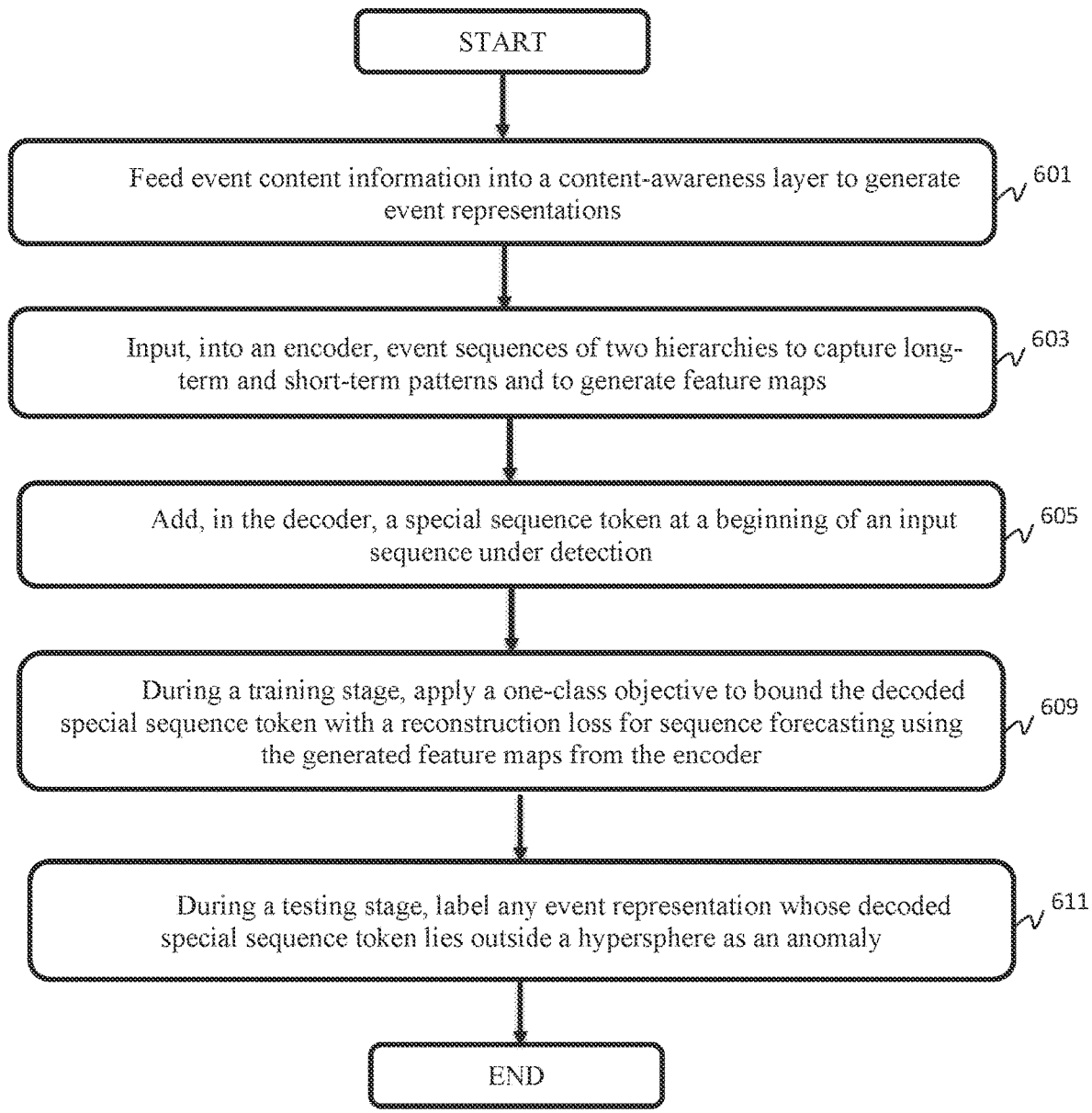
FIG. 6 is a block/flow diagram of an exemplary method for implementing a self-attentive encoder-decoder transformer framework for anomaly detection in event sequences, in accordance with embodiments of the present invention.

FIG. 6 is a block/flow diagram of an exemplary method for implementing a self-attentive encoder-decoder transformer framework for anomaly detection in event sequences, in accordance with embodiments of the present invention.

At block 601, feed event content information into a content-awareness layer to generate event representations.

At block 603, input, into an encoder, event sequences of two hierarchies to capture long-term and short-term patterns and to generate feature maps.

At block 605, add, in the decoder, a special sequence token at a beginning of an input sequence under detection.

At block 607, during a training stage, apply a one-class objective to bound the decoded special sequence token with a reconstruction loss for sequence forecasting using the generated feature maps from the encoder.

At block 609, during a testing stage, label any event representation whose decoded special sequence token lies outside a hypersphere as an anomaly.

In conclusion, the exemplary methods propose CAT 400 for anomaly detection in event sequences. CAT 400 adopts a self-attentive encoder-decoder transformer architecture, where the encoder learns hierarchical event sequence representations with content awareness, and the decoder forecasts the following sequences using the feature maps from the encoder. Specifically, the event content is first fed to a content-awareness layer, generating representations of each event. The encoder accepts preamble event representation sequence of two hierarchies to capture both long-term and short-term sequential patterns. Then, an additional token is added at the beginning of the decoder input sequence, denoting the sequence status. A one-class objective together with sequence reconstruction loss is collectively applied to train the CAT 400 under the label efficiency scheme. Furthermore, CAT 400 is optimized under a scalable and efficient setting.

Moreover, stated differently, CAT 400 enables anomaly detection in event sequences with content. CAT 400 adopts a self-attentive encoder-decoder transformer architecture, where the encoder learns hierarchical event sequence representations with content awareness, and the decoder forecasts the following sequences using the feature maps from the encoder. A content-awareness layer is employed to process the event content information, generating representations of each event considering the sematic meaning of content. A hierarchical encoder is employed to accept sequences of two hierarchies to preserve both long-term and short-term patterns. A special token is added to the start of the decoder's input representation sequence to represent the event sequence status. A one-class objective is designed for anomaly detection to address label efficiency. The decoder simultaneously forecasts all the remaining events, and the sparse multi-head attention module addresses scalability and efficiency issues.

Further, the encoder-decoder transformer-based model CAT has no need for creating multiple observation instances of one event sequence, making it irrelevant to sequence length. The content-awareness layer adopts direct regressions over the [CLS] token rather than pseudo-log-likelihood scores (PLLs) that make copies with each token masked out, decreasing time cost from $O(|e| \cdot V)$ to $O(1)$. The exemplary methods substitute fully connected feed-forward network modules (FFN) to 1-D convolutional filters, followed by a MaxPool layer that further down-samples the size. The decoder of CAT performs a one-time inference for predicting all events rather than the conventional left-to-right decoding with one position offset and is optimized under an L2-norm reconstruction loss, making it less sensitive to sequence length and irrelevant to event alphabet space. The exemplary methods adopt a sparse version of the self-attention module that preserves top-K valued attentions.

As used herein, the terms "data," "content," "information" and similar terms can be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, the data can be received directly from another computing device or can be received indirectly via one or more intermediary computing devices, such as, for example, one or more servers, relays, routers, network access points, base stations, and/or the like.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," "calculator," "device," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, RAM, ROM, an Erasable Programmable Read-Only Memory (EPROM or Flash memory), an optical fiber, a portable CD-ROM, an optical data storage device, a magnetic data storage device, or any suitable combination of the foregoing. In the context of this document, a computer readable storage medium may be any tangible medium that can include, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks or modules.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks or modules.

It is to be appreciated that the term "processor" as used herein is intended to include any processing device, such as, for example, one that includes a CPU and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for implementing a self-attentive encoder-decoder transformer framework for anomaly detection in event sequences, the method comprising:
   feeding event content information into a content-awareness layer to generate event representations;
   inputting, into an encoder, event sequences of two hierarchies to capture long-term and short-term patterns and to generate feature maps;
   adding, in the decoder, a special sequence token at a beginning of an input sequence under detection;
   during a training stage, applying a one-class objective to bound the decoded special sequence token with a reconstruction loss for sequence forecasting using the generated feature maps from the encoder; and
   during a testing stage, labeling any event representation whose decoded special sequence token lies outside a hypersphere as an anomaly.

2. The method of claim 1, wherein the decoder embeds the event sequences into a latent space where anomalies are distinguishable.

3. The method of claim 1, wherein the special sequence token represents event sequence status.

4. The method of claim 1, wherein the encoder includes attention blocks, 1-D convolutional filters with activation functions, and MaxPool layers to downsample the inputted event sequences of the two hierarchies.

5. The method of claim 1, wherein the decoder includes a masked self-attention layer to preserve an auto-regressive property.

6. The method of claim 1, wherein the decoder performs a one-time interference to predict all events.

7. The method of claim 1, wherein the input sequence under detection of the decoder includes padded zeroes inferred by a one forward procedure.

8. A non-transitory computer-readable storage medium comprising a computer-readable program for implementing a self-attentive encoder-decoder transformer framework for anomaly detection in event sequences, wherein the computer-readable program when executed on a computer causes the computer to perform the steps of:
- feeding event content information into a content-awareness layer to generate event representations;
- inputting, into an encoder, event sequences of two hierarchies to capture long-term and short-term patterns and to generate feature maps;
- adding, in the decoder, a special sequence token at a beginning of an input sequence under detection;
- during a training stage, applying a one-class objective to bound the decoded special sequence token with a reconstruction loss for sequence forecasting using the generated feature maps from the encoder; and
- during a testing stage, labeling any event representation whose decoded special sequence token lies outside a hypersphere as an anomaly.

9. The non-transitory computer-readable storage medium of claim 8, wherein the decoder embeds the event sequences into a latent space where anomalies are distinguishable.

10. The non-transitory computer-readable storage medium of claim 8, wherein the special sequence token represents event sequence status.

11. The non-transitory computer-readable storage medium of claim 8, wherein the encoder includes attention blocks, 1-D convolutional filters with activation functions, and MaxPool layers to downsample the inputted event sequences of the two hierarchies.

12. The non-transitory computer-readable storage medium of claim 8, wherein the decoder includes a masked self-attention layer to preserve an auto-regressive property.

13. The non-transitory computer-readable storage medium of claim 8, wherein the decoder performs a one-time interference to predict all events.

14. The non-transitory computer-readable storage medium of claim 8, wherein the input sequence under detection of the decoder includes padded zeroes inferred by a one forward procedure.

15. A system for implementing a self-attentive encoder-decoder transformer framework for anomaly detection in event sequences, the system comprising:
- a memory; and
- one or more processors in communication with the memory configured to:
  - feed event content information into a content-awareness layer to generate event representations;
  - input, into an encoder, event sequences of two hierarchies to capture long-term and short-term patterns and to generate feature maps;
  - add, in the decoder, a special sequence token at a beginning of an input sequence under detection;
  - during a training stage, apply a one-class objective to bound the decoded special sequence token with a reconstruction loss for sequence forecasting using the generated feature maps from the encoder; and
  - during a testing stage, label any event representation whose decoded special sequence token lies outside a hypersphere as an anomaly.

16. The system of claim 15, wherein the decoder embeds the event sequences into a latent space where anomalies are distinguishable.

17. The system of claim 15, wherein the special sequence token represents event sequence status.

18. The system of claim 15, wherein the encoder includes attention blocks, 1-D convolutional filters with activation functions, and MaxPool layers to downsample the inputted event sequences of the two hierarchies.

19. The system of claim 15, wherein the decoder includes a masked self-attention layer to preserve an auto-regressive property.

20. The system of claim 15, wherein the decoder performs a one-time interference to predict all events.

* * * * *